US011661857B2

(12) United States Patent
Rosenfeld et al.

(10) Patent No.: US 11,661,857 B2
(45) Date of Patent: May 30, 2023

(54) ELECTRICITY GENERATING SYSTEMS WITH THERMAL ENERGY STORAGE COUPLED SUPERHEATERS

(71) Applicant: Cyrq Energy, Inc., Salt Lake City, UT (US)

(72) Inventors: Matt Rosenfeld, Salt Lake City, UT (US); Susan Petty, Salt Lake City, UT (US)

(73) Assignee: Cyrq Energy, Inc., Salt Lake City, UT (US)

( * ) Notice: Subject to any disclaimer, the term of this patent is extended or adjusted under 35 U.S.C. 154(b) by 220 days.

(21) Appl. No.: 17/349,496

(22) Filed: Jun. 16, 2021

(65) Prior Publication Data
US 2022/0025779 A1 Jan. 27, 2022

Related U.S. Application Data

(60) Provisional application No. 63/039,612, filed on Jun. 16, 2020.

(51) Int. Cl.
*F01D 15/10* (2006.01)
*H02S 10/10* (2014.01)
(Continued)

(52) U.S. Cl.
CPC .............. *F01D 15/10* (2013.01); *F01D 13/00* (2013.01); *H02K 7/1823* (2013.01); *H02S 10/10* (2014.12); *F05D 2220/72* (2013.01)

(58) Field of Classification Search
CPC ....... F01D 15/10; F01D 13/00; H02K 7/1823; H02S 10/10; F05D 2220/72;
(Continued)

(56) References Cited

U.S. PATENT DOCUMENTS 5,799,481 A * 9/1998 Fetescu .................. F01K 17/025
60/39.182
6,240,718 B1 * 6/2001 Fetescu .................. F01K 17/025
237/12.1
(Continued)

FOREIGN PATENT DOCUMENTS

WO   WO 2010/085574 A1   7/2010
WO   WO 2013/018014 A2   2/2013
(Continued)

OTHER PUBLICATIONS

PCT Application No. PCT/US21/37671 Filing date Jun. 16, 2021 Matt Rosenfeld International Search report dated Sep. 24, 2021; 14 Pages.
(Continued)

*Primary Examiner* — Pedro J Cuevas
(74) *Attorney, Agent, or Firm* — Thorpe North and Western LLP

(57) ABSTRACT

The present disclosure describes methods and systems for generating electricity. A method of generating electricity can include evaporating water with a low grade heat source to form low-temperature steam. The low-temperature steam can be superheated to a superheated temperature by transferring heat to the low-temperature steam from a thermal energy storage that is at a temperature higher than the superheated temperature. A steam turbine generator can be powered with the superheated steam to generate electricity. The thermal energy storage can be recharged using electricity from an intermittent electricity source.

22 Claims, 4 Drawing Sheets

(51) Int. Cl.
  *F01D 13/00* (2006.01)
  *H02K 7/18* (2006.01)
(58) Field of Classification Search
  CPC . F05D 2220/60; F05D 2260/42; Y02E 10/50; F03G 4/033; F03G 7/0252
  See application file for complete search history.

(56) References Cited

U.S. PATENT DOCUMENTS

| | | | |
|---|---|---|---|
| 6,405,525 B1* | 6/2002 | Droux | F01K 23/10 60/39.182 |
| 6,463,738 B1 | 10/2002 | Pinkerton et al. | |
| 8,341,961 B2* | 1/2013 | Glynn | C02F 1/14 60/641.11 |
| 8,881,805 B2 | 11/2014 | Klemencic | |
| 8,991,183 B2 | 3/2015 | Stiesdal | |
| 9,181,930 B2 | 11/2015 | Klemencic | |
| 9,194,377 B2 | 11/2015 | Terdalkar et al. | |
| 9,541,071 B2 | 1/2017 | Kroizer | |
| 9,638,173 B2 | 5/2017 | Ehrsam et al. | |
| 9,683,788 B2 | 6/2017 | Olcese | |
| 9,695,805 B2 | 7/2017 | Kukonya et al. | |
| 10,047,729 B2 | 8/2018 | Heller | |
| 10,145,365 B2 | 12/2018 | Brenmiller et al. | |
| 10,208,630 B2 | 2/2019 | Kirchner et al. | |
| 10,982,570 B2* | 4/2021 | Conlon | F01K 3/185 |
| 11,359,521 B2* | 6/2022 | Conlon | F01K 11/02 |
| 2007/0220889 A1 | 9/2007 | Nayef et al. | |
| 2009/0090109 A1 | 4/2009 | Mills et al. | |
| 2010/0275599 A1* | 11/2010 | Glynn | F03G 6/065 60/648 |
| 2012/0067047 A1 | 3/2012 | Peterson et al. | |
| 2012/0112473 A1* | 5/2012 | Glynn | B01D 1/0035 290/1 R |
| 2012/0138447 A1* | 6/2012 | Glynn | F03D 1/04 202/189 |
| 2013/0056170 A1 | 3/2013 | Klemencic | |
| 2013/0284394 A1 | 10/2013 | Morgan et al. | |
| 2014/0216032 A1 | 8/2014 | Levin | |
| 2015/0300326 A1 | 10/2015 | Namburi et al. | |
| 2015/0337760 A1 | 11/2015 | Filippone | |
| 2016/0024973 A1 | 1/2016 | Rosenfeld et al. | |
| 2016/0069218 A1 | 3/2016 | Lenk et al. | |
| 2016/0222947 A1 | 8/2016 | Venkatachalam et al. | |
| 2016/0319746 A1 | 11/2016 | Kraft et al. | |
| 2017/0184002 A1 | 1/2017 | Filippone | |
| 2017/0241649 A1 | 8/2017 | Cave | |
| 2017/0363368 A1 | 12/2017 | Bergan et al. | |
| 2018/0201518 A1 | 7/2018 | Schubert | |
| 2018/0245485 A1 | 8/2018 | Conlon | |
| 2018/0263194 A1 | 9/2018 | Pilebro et al. | |
| 2021/0324765 A1* | 10/2021 | Conlon | F01K 13/02 |
| 2022/0049630 A1* | 2/2022 | Bollinger | F01K 3/186 |
| 2022/0049652 A1* | 2/2022 | Bollinger | F01K 7/38 |
| 2022/0049653 A1* | 2/2022 | Bollinger | F02C 6/14 |
| 2022/0214119 A1* | 7/2022 | Skottene | F28D 20/028 |

FOREIGN PATENT DOCUMENTS

| | | |
|---|---|---|
| WO | WO 2017/222476 A1 | 12/2017 |
| WO | WO 2018/101989 A1 | 7/2018 |
| WO | WO 2018/178154 A1 | 10/2018 |

OTHER PUBLICATIONS

Bartos.; "Integrated energy-storage systems." Control Engineering; Nov. 2012; 5 Pages.
Coventry et al.; "Coupling Supercritical and Superheated Direct Steam Generation with Thermal Energy Storage." Proceedings of the 15$^{th}$ Internation Solar PACES Conference; Jan. 2009; 8 Pages.
Johnson et al.; "High Temperature Latent Heat Thermal Energy Storage Integration in a Co-Gen Plant." Energy Procedia; Elsevier; vol. 73; Jun. 2015; pp. 281-288.
Lior.; "Energy, Exergy and Thermoeconomic Analysis of the Effects of Fossil-Fuel Superheating in Nuclear Power Plants." Energy Convers. Mgmt; vol. 38. No. 15-17, pp. 1585-1593, 1997.
Penny.; "Energy When You Need It: Pair Renewables With Enegy Storage to Benefit Your Bottom Line." Stamats Communications, Inc. (Dec. 2018); Buildings 112.12: 10(1); 3 Pages. (Abstract).
Thurston.; "Solar Boost." Public Utilities Fortnightly; Public Utilities Reports Incorporated; Jul. 2012; vol. 150, Issue 7; pp. 28-33.
Yang et al.; "Experimental studies and experience on a 1MWe superheated steam tower CSP demonstrator." AIP Conference Proceedings; Nov. 8, 2018; vol. 2033; 9 Pages. (Abstract).

* cited by examiner

ELECTRICITY GENERATING SYSTEMS WITH THERMAL ENERGY STORAGE COUPLED SUPERHEATERS

RELATED APPLICATION(S)

This application claims the benefit of U.S. Provisional Patent Application No. 63/039,612, filed Jun. 16, 2020, which is incorporated herein by reference.

FIELD OF THE INVENTION

The present technology relates to electricity generation methods and systems.

BACKGROUND

For a variety of reasons including balancing intermittent renewable output and fluctuations in demand, bulk energy storage has a tremendous and growing value on the grid. Electrochemical storage in the form of batteries has proven effective for storage applications requiring 4 hours or less of discharge capacity. In order to make longer duration storage economically viable, the incremental cost for adding discharge duration should be low. While flow batteries show promise, there are still many hurdles to overcome including high equipment costs and the use of expensive materials such as vanadium. Pumped hydro and compressed air storage can work very well for long duration but are geographically constrained.

SUMMARY

The present disclosure describes systems and methods for generating electricity by using a steam turbine generator with a thermal energy storage coupled superheater and/or reheater. The least efficient step in any Rankine or steam cycle is the phase change of vaporizing a liquid. The present disclosure relies on a low-grade heat source such as a geothermal resource or industrial waste heat to boil steam or a working fluid and leaves the more efficient parts of the heat input process, superheat and reheat, to a thermal energy storage system. This leads to a very efficient use of thermal energy storage.

The steam turbine generator can produce electricity from steam that has been superheated using the thermal energy storage. In one example, a method of generating electricity can include evaporating water with a low grade heat source to generate steam at or near the saturation point. The low-temperature steam can be superheated to a superheated temperature by transferring heat to the low-temperature steam from a thermal energy storage that is at a temperature higher than the superheated temperature. The superheated steam can be used to power a steam turbine generator to generate electricity. The thermal energy storage can be recharged using electricity from an intermittent electricity source such as photovoltaic cells, wind turbines, and so on.

The low-temperature steam can have a temperature from right at the saturation point to 50° C. or so above the saturation point. The exact temperatures will depend on the pressure. When the steam is superheated by the thermal energy storage system, the temperature can rise by anywhere from 50° C. to over 300° C. once again depending on pressure and plant configuration. Higher pressure systems can also involve a thermal energy storage based reheater or replace the superheater with a reheater.

In certain examples, the steam turbine generator can run continuously. For example, the low grade heat source can continuously be used to evaporate water and form low-temperature steam, and the steam can continuously be superheated using the thermal energy storage and then run through the steam turbine generator to generate electricity. While this is running continuously, the thermal energy storage can be recharged intermittently.

In particular examples, the low grade heat source can be a geothermal well, industrial waste heat, a nuclear reactor, or a combination thereof. In further examples, the intermittent electricity source can be a photovoltaic cell, a hydroelectric generator, a wind turbine, or a combination thereof. In a specific example, the thermal energy storage can also be recharged using electricity generated by the steam turbine generator or supplied by the grid. Thermal energy storage systems can be recharged with electricity or thermal input (heat).

The method can also include condensing exhausted steam from the steam turbine generator to form a condensate and returning the condensate to the low grade heat source. In another example, exhausted steam from the steam turbine generator can be reheated by transferring heat from the thermal energy storage. A second steam turbine generator can then be powered with the reheated steam.

In other examples, the steam turbine generator can be operated utilizing relatively drier exhaust with a higher temperature, or condensing moisture in a relatively lower temperature vapor. In a first operation mode, the steam turbine generator can exhaust steam having a lower vapor fraction. The lower vapor fraction can be associated with higher fractions of superheated steam which also reduces power generation from the generator. In the second operation mode, the steam turbine generator can exhaust steam having a higher vapor fraction. Thus, operation of the steam turbine generator represents a compromise between condensing vapor and the use of superheat.

In various examples, the thermal energy storage can include a thermal storage medium such as molten salt, silicon, cement, rock, other commercially available thermal storage materials or combinations thereof.

The present disclosure also describes electricity generating systems. In one example, an electricity generating system can include a low grade heat source and thermal energy storage that has a temperature that is higher than the temperature of the low grade heat source. A superheater can be fluidly connected to the low grade heat source to receive low-temperature steam from the low grade heat source. The superheater can transfer heat from the thermal energy storage to the low-temperature steam to superheat the low-temperature steam to a superheated temperature. A steam turbine generator can be fluidly and thermally connected to the superheater to receive the superheated steam and generate electricity by converting power from the superheated steam. An intermittent electricity source can be electrically connected to the thermal energy storage to recharge the thermal energy storage.

The low-temperature steam can have a temperature from right at the saturation point to 50° C. or so above the saturation point. The exact temperatures will depend on the pressure. When the steam is superheated by the thermal energy storage system, the temperature can rise by anywhere from 50° C. to over 300° C. once again depending on pressure and plant configuration. Higher pressure systems can also involve a thermal energy storage based reheater or replace the superheater with a reheater.

In further examples, the low-temperature steam can be formed continuously by evaporating water with heat from the low grade heat source. The low-temperature steam can also be superheated continuously, and the steam turbine generator can generate electricity continuously, while the thermal energy storage can be recharged intermittently. In certain examples, the low grade heat source can be a geothermal well, industrial waste heat, a nuclear reactor, or a combination thereof. In other examples, the intermittent electricity source can be a photovoltaic cell, hydroelectric generator, wind turbine, or combination thereof. In some examples, the steam turbine generator can also be electrically connected to the thermal energy storage to recharge the thermal energy storage using electricity generated by the steam turbine generator.

In a particular example, the system can also include a condenser fluidly connected to the steam turbine generator to receive exhausted steam from the steam turbine generator and condense the exhausted steam to form a condensate. The condenser can also be fluidly connected to the low grade heat source to return the condensate to the low grade heat source.

In another example, the system can also include a reheater and a second steam turbine generator. The reheater can be fluidly connected to the first steam turbine generator to receive exhausted steam from the first steam turbine generator, and the reheater can transfer heat from the thermal energy storage to the exhausted steam. The second steam turbine generator can be fluidly connected to the reheater to receive reheated steam from the reheater and generate electricity by converting power from the reheated steam.

In yet another example, the steam generator can be switchable between a first operation mode and a second operation mode, and the steam turbine generator can exhaust steam having a lower vapor fraction in the first operation mode than in the second operation mode.

In several examples, the thermal energy storage can include a thermal storage medium selected from the group consisting of molten salt, silicon, cement, rock, and combinations thereof.

Additional features and advantages of these principles will be apparent from the following detailed description, which illustrates, by way of example, features of the invention.

Figure 1:
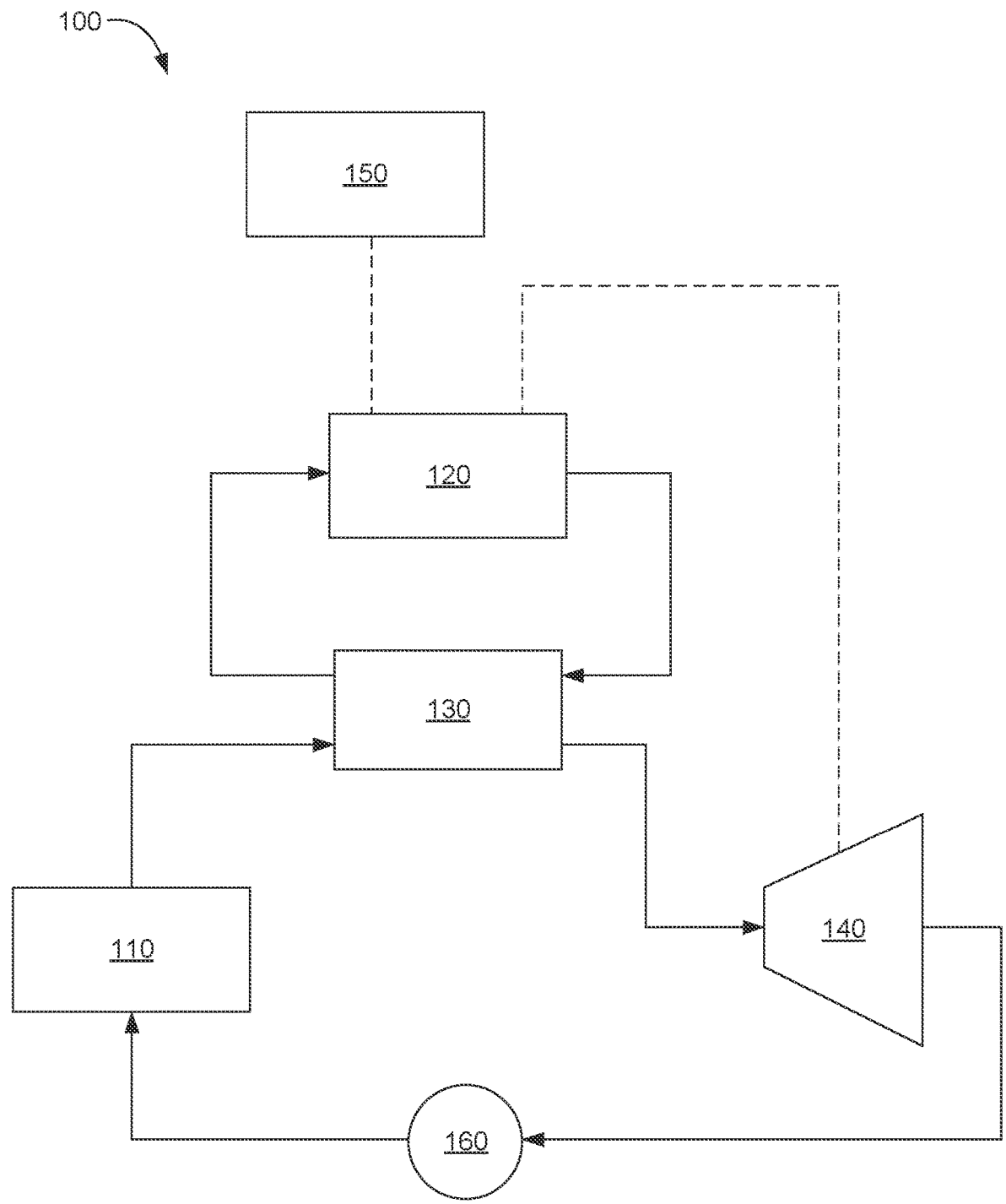
FIG. 1 is a schematic diagram of an example system for generating electricity in accordance with examples of the present technology.

These drawings are provided to illustrate various aspects of the technology and are not intended to be limiting of the scope in terms of dimensions, materials, configurations, arrangements or proportions unless otherwise limited by the claims.

DETAILED DESCRIPTION

Reference will now be made to exemplary embodiments and specific language will be used herein to describe the same. It will nevertheless be understood that no limitation of the scope of the technology is thereby intended. Alterations and further modifications of the features described herein, and additional applications of the principles of the technology as described herein, which would occur to one skilled in the relevant art and having possession of this disclosure, are to be considered within the scope of the technology. Further, before particular embodiments are disclosed and described, it is to be understood that this technology is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a heat source" includes reference to one or more of such features, "a fluid" includes reference to one or more of such materials, and "a heating step" refers to one or more of such steps.

As used herein, "low grade heat" refers to heat at a lower relative temperature than high grade heat. It can be difficult to utilize low grade heat to generate work because the low grade heat is at a low temperature. The term "low-temperature" is used herein to describe such low grade steam has an enthalpy within about 10% of saturation on an enthalpy basis. The low-grade heat may be able to evaporate water to form steam. In some examples, low grade heat can be at a temperature from about 100° C. to about 250° C. In other examples, low grade heat can be at a temperature from about 120° C. to about 250° C., or from about 150° C. to about 250° C. Heat can be transferred from the low grade heat source to water to form low temperature steam at a first temperature. In some examples, the first temperature of the low temperature steam can be near or the same as the temperature of the low grade heat source.

As used herein, "low temperature steam" is used to differentiate from superheated steam. Thus, the term "low temperature" is not intended to describe any particular temperature or temperature range, but rather to distinguish the steam from superheated steam. As explained in more detail herein, the processes for generating electricity described herein can include forming low temperature steam and then adding additional heat to the low temperature steam from a thermal energy storage to form superheated steam. The superheated steam has a higher temperature than the low temperature steam.

As used herein, "thermal energy storage" or "TES" is any component or system that can store thermal energy, which can be transferred from the thermal energy storage to the low temperature steam through heat transfer in order to superheat the steam. The thermal energy storage can include a thermal energy storage medium, which can be a material that stores heat energy. Various thermal energy storage media can be used. The medium can be a solid, liquid, gas, or combination thereof depending on the specific type of medium used. In some examples, the thermal energy storage medium can store thermal energy via sensible heat, meaning heat energy that direct increases the temperature of the medium. In other examples, the thermal energy storage medium can store thermal energy via latent heat of a phase change. In still further examples, a combination of sensible heat and latent heat can be used. The thermal energy storage can also include a variety of other components, such as a container to contain the thermal energy storage medium, insulation, equipment for circulating the thermal energy storage medium, heat exchangers for transferring energy to and from the thermal energy storage medium, and so on.

As used herein, "intermittent electricity source" refers to any electricity source that does not produce a constant supply of electric current. Some examples of intermittent electricity sources include photovoltaic cells, solar thermal generators, wind turbines, hydroelectric dams, tidal generators, and others. These sources of electricity can be difficult to use in the electric grid because they do not produce a constant supply of electricity and the amount of electricity produced may be unpredictable and not easily controllable. The technology described herein allows for more convenient use of such intermittent electricity sources by using the intermittent electricity supply to store energy in a thermal energy storage that can then be used to power a more controllable steam turbine generator.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data. However, unless otherwise enunciated, the term "about" generally connotes flexibility of less than 2%, most often less than 1%, and in some cases less than 0.01%.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Energy Generation with Thermal Energy Storage Coupled Superheater

Thermal energy storage (TES) has huge potential advantages including low cost, high energy density, low environmental impact, long system lifespan, reliability, and design flexibility. These advantages come with one major drawback—low round trip efficiency on pure electric to electric conversion. The present disclosure provides a higher efficiency application for thermal energy storage.

The present disclosure describes methods and systems for generating electricity using a low grade heat source and thermal energy storage. Thermal energy storage refers to a variety of technologies in which energy can be stored in the form of heat. These technologies often use a storage medium to store heat for use at a later time. Some examples of storage media include molten salts, silicon, steam, hot water, concrete, rock, miscibility gap alloys, and others. The storage medium can be enclosed in an insulated system so that the storage medium can retain heat for a long period of time, such as days, weeks, or months.

Thermal energy storage can be used together with intermittent energy generation processes for capacity firming. In other words, thermal energy storage can be used with an intermittent energy source, such as solar or wind power, to store energy at times when the intermittent energy source is producing excess energy, and then the thermal energy can be used during times when the intermittent energy source is not producing sufficient energy. As an example, solar panels can be used to generate electricity, and the electricity can power an electric heater to heat a thermal energy storage medium. The thermal energy that is stored in the storage medium can then be used at any time, even at night or other times when the solar panels are not producing electricity. In some cases, the stored thermal energy can be used to generate electricity by boiling water to generate steam to run a steam turbine generator, for example. However, one drawback to using thermal energy storage in this way is the relatively low discharging efficiency associated with running Rankine cycle or Brayton cycle power generation systems using thermal energy storage.

The methods and systems described herein can overcome this drawback by utilizing a hybrid system that involves coupling thermal energy storage with a low grade heat source where the thermal energy storage is only called upon for the most efficient parts of the power generation cycle. In a specific example, the thermal energy storage system can superheat steam. A low grade heat source can be used to generate saturated or near saturated steam. Electricity can be used to power one or more electric heaters that can charge the thermal energy storage system. The thermal energy storage system can discharge by superheating the steam. The steam can be used to power a steam turbine generator. Superheating the steam using the thermal energy storage in this way can boost the power output of the steam cycle.

The thermal energy storage can also provide additional flexibility to allow varying power output depending on electricity demand. For example, heat energy from the thermal energy storage can be transferred to steam to superheat the steam when a higher power output is desired, or the heat transfer can be stopped if lower power output is desired. The rate at which heat is transferred from the thermal energy storage can also be adjusted, thereby adjusting the amount of superheating of the steam. In some examples, the steam turbine generator can be designed to operate in multiple operation modes depending on the amount of energy that is transferred from the thermal energy storage. In one example, the steam turbine generator can operate in a low power mode when the thermal energy storage is not being used to superheat the steam. In this mode, the steam turbine generator can be powered by saturated steam, for example. The steam turbine generator can also operate in a high power mode, in which the thermal energy storage is used to superheat the steam. Multiple intermediate modes can also be used with multiple different levels of superheating. Steam turbine generators are usually run at steady state, without changes in the power output or steam used to power the steam turbine generators. However, the steam turbine generators used in the processes described herein can be switched at will between different modes of operation, depending on the desired amount of superheating by the thermal energy storage. Thus, the steam turbine engines described herein may not operate at steady state, which is different from typical steam turbine generators.

An example electricity generation system using the technology described herein is shown in FIG. 1. This system 100 includes a low grade heat source 110, a thermal energy storage 120, a superheater 130, a steam turbine generator 140, an intermittent electricity source 150, and a condenser 160. The low grade heat source can be a heat source at a relatively low temperature, such as a geothermal well, industrial waste heat, heat from a nuclear reactor, or another low-temperature heat source. The low grade heat source can be sufficient to evaporate water to form saturated or nearly saturated steam. This low-temperature steam can flow from the low grade heat source to the superheater. The superheater can transfer heat from the thermal energy storage to the steam. The thermal energy storage can have a temperature that is higher than the temperature of the low-grade heat source. The temperature of the thermal energy storage can be high enough to allow for superheating the steam in the superheater. In some examples, the thermal energy storage can be separate from the superheater and a heat transfer fluid can flow from the thermal energy storage to the superheater to provide the heat to the steam. In other examples, the thermal energy storage can be located within the superheater or be a part of the superheater so that heat can be transferred directly from the thermal energy storage to the steam. After being superheated, the steam flows to the steam turbine generator. The steam turbine generator can generate electricity by converting power from the superheated steam. In some examples, a portion of the electricity generated by the steam turbine generator can be used to recharge the thermal energy storage. The intermittent electricity source can also be used to recharge the thermal energy storage. As shown in the figure, the intermittent electricity source can be connected to the thermal energy storage to recharge the thermal energy storage by powering electric heaters.

Figure 2:
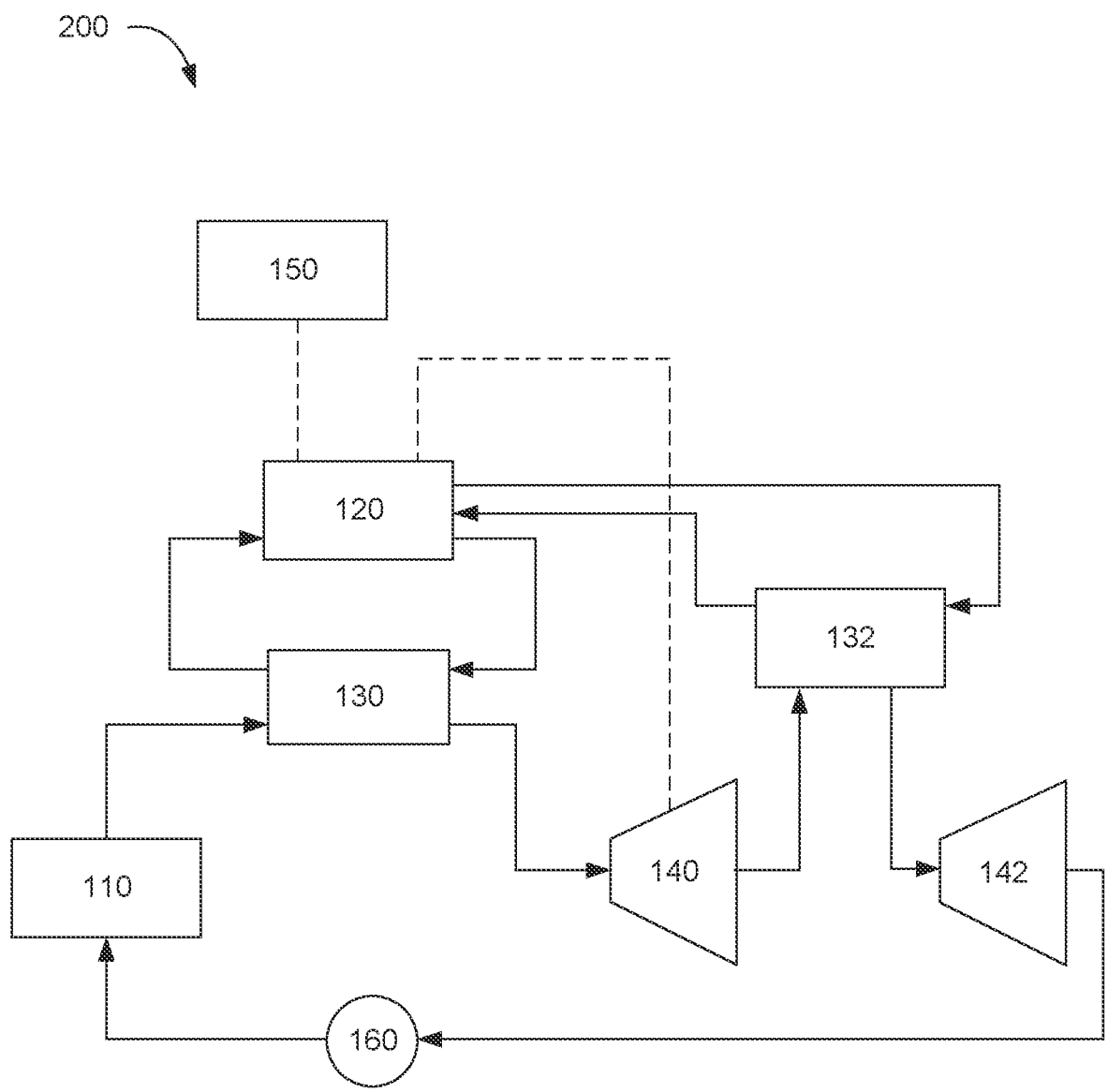
FIG. 2 is a schematic diagram of another example system for generating electricity in accordance with examples of the present technology.

In another example, the exhaust steam exiting the steam turbine generator can be reheated again by transferring additional heat to the exhaust steam from the thermal energy storage. The reheated steam can then be used to power a second steam turbine generator. FIG. 2 shows one such example system 200. In this system, exhaust steam from the steam turbine generator 140 is reheated using a reheater 132 that transfers heat from the thermal energy storage 120 to the exhaust steam. The reheated steam is then used to power a second steam turbine generator 142.

Figure 3:
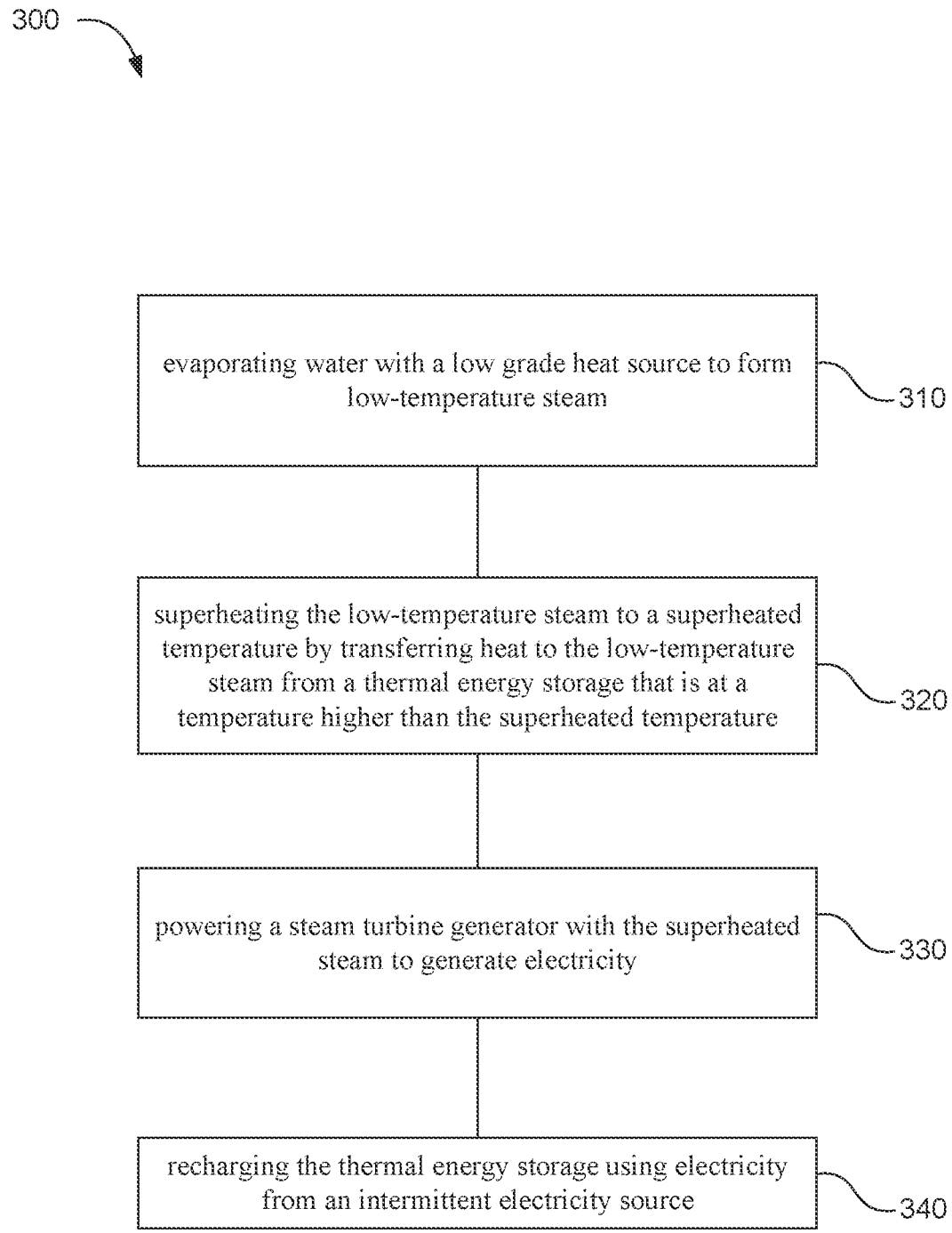
FIG. 3 is a flowchart illustration an example method of generating electricity in accordance with examples of the present technology.

The present disclosure also describes methods of generating electricity. A flowchart of an example method 300 is shown in FIG. 3. This method includes: evaporating water with a low grade heat source to form low-temperature steam 310; superheating the low-temperature steam to a superheated temperature by transferring heat to the low-temperature steam from a thermal energy storage that is at a temperature higher than the superheated temperature 320; powering a steam turbine generator with the superheated steam to generate electricity 330; and recharging the thermal energy storage using electricity from an intermittent electricity source 340.

Figure 4:
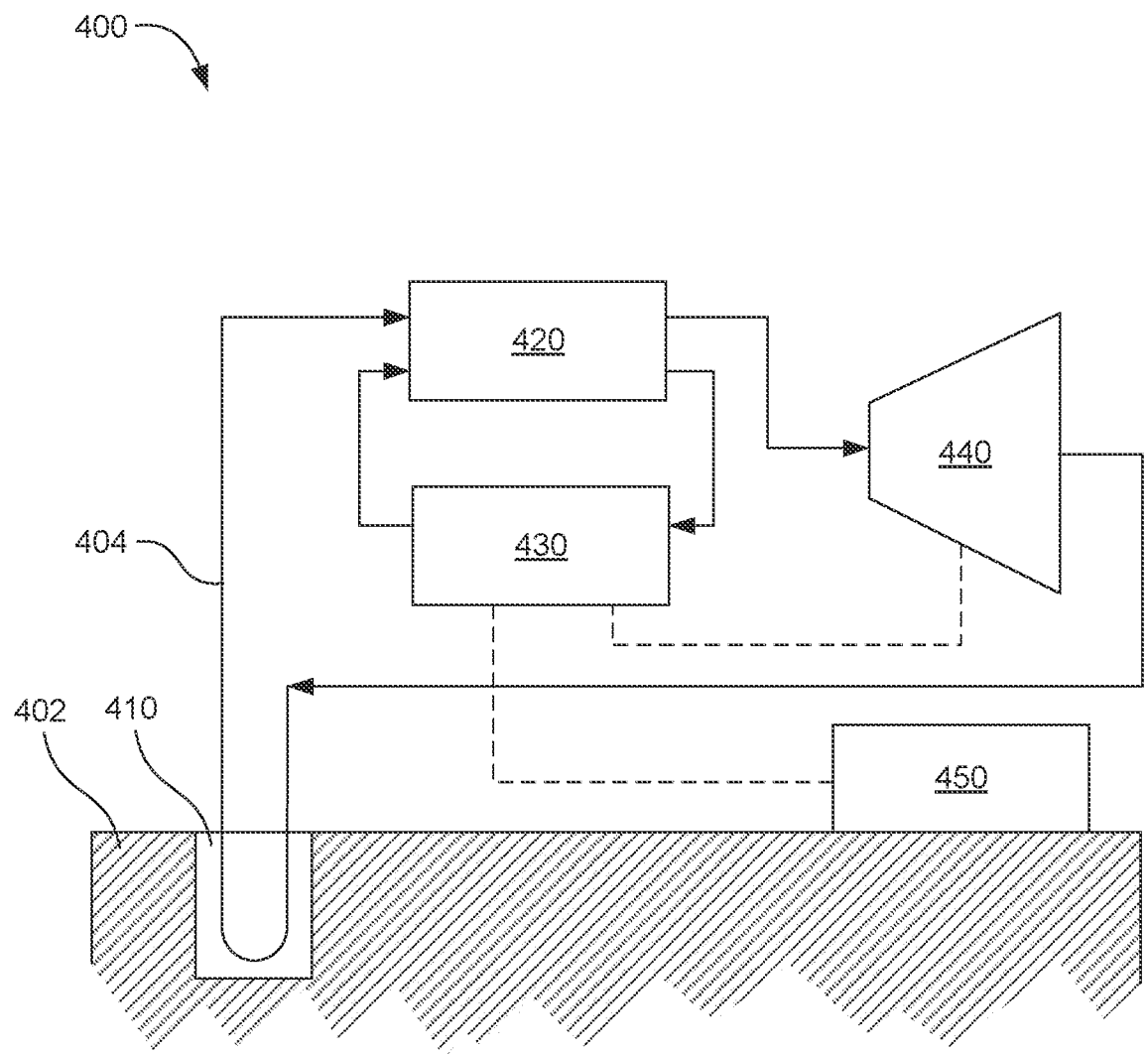
FIG. 4 is a diagram of another example method of generating electricity in accordance with examples of the present technology.

Another example method of generating electricity is shown schematically in FIG. 4. This figure shows a geothermal well 410 dug into the ground 402 that is used as a low grade heat source. A working fluid line 404 passes through the geothermal well so that heat can be transferred to steam in the working fluid line. In some examples, the steam can directly contact the geothermal formation, or in other examples, a heat exchanger can be used to transfer heat from the geothermal formation to the steam in the working fluid line. Low temperature steam can flow from the geothermal well to thermal energy storage superheater 420 (whereas the thermal energy storage and superheater were shown as two separate components in previous figures, these are combined into component 420 in FIG. 4). The thermal energy storage superheater can superheat the steam, and the superheated steam can flow to a steam turbine generator 440. The exhaust steam from the turbine is cycled back to the geothermal well. This figure also shows a reheater 430 that is used to reheat the thermal energy storage medium, which is cycled from the reheater to the thermal energy storage superheater. The reheater can include an electric heater that is powered by electricity produced by a photovoltaic cell 450. The steam turbine generator is also electrically connected to the reheater so that a portion of the electricity produced by the steam turbine generator can be used to reheat the thermal energy storage. The remainder of the electricity produced by the steam turbine generator can go to the power grid or to fulfil another electricity demand.

The electricity generating systems and methods described herein can be very efficient because the high-temperature thermal energy storage can be used only for superheating the steam, whereas the energy input for evaporating the water to form the steam can be supplied by the low grade heat source. Electric heaters can be well adapted to recharge the thermal energy storage because electric heaters can be capable of heating to high temperatures. Powering the electric heaters with an intermittent electricity source also takes advantage of the ability of the thermal energy storage to store heat for a long period of time. The superheated steam can provide a good amount of power to the steam turbine generator.

In some examples, the low grade heat source can be any source of heat having a temperature at which steam has an enthalpy within about 10% of its saturation point to about 50° C. above the saturation point, and in some cases within about 5%. In further examples, the low grade heat source can have a sufficient temperature to evaporate water. In certain examples, the low grade heat source can be a geothermal well, industrial waste heat, a nuclear reactor, or a combination thereof. In some examples, water can pass through the low grade heat source itself or through a heat exchanger in contact with the low grade heat source to evaporate the water. The low-temperature steam formed in this way can be at the temperature of the low grade heat source or a slightly lower temperature than the low grade heat source. In some examples, the low-temperature steam can have a temperature from about 100° C. to about 250° C., or from about 120° C. to about 240° C., or from about 150° C. to about 230° C. The low-temperature steam can flow to a superheater where the low-temperature steam can be superheated with heat from the thermal energy storage. In some examples, the superheated steam can have a temperature from about 300° C. to about 1000° C., or from about 350° C. to about 900° C., or from about 400° C. to about 800° C.

In some examples, the thermal energy storage used in the processes described herein can include a molten salt storage medium. More specific examples of the storage medium can include a eutectic mixture of salts. Examples of salts can include sodium nitrate, sodium nitrite, potassium nitrate, calcium nitrate, and others. In some cases, the thermal energy storage can be used in a way that maintains the molten salt in a liquid state (i.e., above the melting temperature of the salt). Molten salts can be useable across a range of temperatures at which the salt is in the liquid state. In some examples, the salt can have a melting temperature from about 150° C. to about 500° C. In other examples, the salt can have a melting temperature from about 200° C. to about 450° C. or from about 300° C. to about 450° C. The salt can be useable in the liquid state up to a maximum temperature. In some examples, the maximum temperature for using the salt can be from about 400° C. to about 1,000° C., or from about 450° C. to about 900° C., or from about 500° C. to about 800° C. In certain examples, the molten salt can be used as a heat transfer fluid. In such systems, the molten salt can be pumped to different locations, such as a storage tank, a heat exchanger, or a superheater. In a particular example, molten salt can be pumped to a superheater where heat can be transferred from the molten salt to the low-temperature steam. The molten salt that has been cooled after transferring heat to the steam can then be pumped back to a storage tank. Accordingly, the process can be designed so that the molten salt stays above the melting temperature of the molten salt, so that the molten salt remains in the liquid state. In other examples, a separate heat transfer fluid can be used to transfer heat from a reservoir of the molten salt, and then the heat transfer fluid can be pumped to the superheater to transfer the heat to the low-temperature steam. In yet another example, the molten salt can be stored in the superheater itself, and the low-temperature steam can be heated by the molten salt as the steam flows through the superheater. In some examples, the superheater can include a heat exchanger for transferring heat from the thermal storage medium to the low-temperature steam.

In further examples, any of the above arrangements can be used with a storage medium other than molten salt.

As mentioned above, the thermal energy storage can be charged using electricity from an intermittent electricity source. Intermittent electricity sources can include any source of electricity that does not produce a constant supply of electric current. Solar power, such as from photovoltaic cells, is one example of an intermittent electricity source. Electricity derived from solar power is often available only in the day time when the sky is clear. Thus, this type of electricity supply is intermittent. Another example is wind power, such as from wind turbines. Wind is not always predictable and wind power may not be available at all times, depending on the wind speed. Other examples can include hydroelectric power, such as hydroelectric dams or tidal generators. In some examples, the intermittent electricity source can produce electricity at an average availability rate from about 10% to about 90%, or from about 20% to about 80%, or from about 30% to about 70%. In further examples, the average availability rate of the intermittent electricity source can be less than 70%, less than 60%, or less than 50%. The average availability rate can be the overall percentage of time that the electricity source produces a sufficient amount of electricity to recharge the thermal energy storage.

After steam has been superheated using heat from the thermal energy storage, the superheated steam can flow to a steam turbine generator. Steam turbine generators can be designed to extract different amounts of power from steam. In some examples, the turbine can extract so much power that the steam begins to condense within the turbine. This can produce high levels of electricity, but the condensation within the turbine can cause wear and tear on the turbine. Thus, turbines operated in this way may wear out more quickly.

In some examples, the steam turbine can be capable of operating in at least two modes with varying levels of superheat. For example, a single turbine can operate with the low-grade heat source and varying levels of superheat. In this case, there is a trade-off between superheat and exhaust condensation. The exhaust steam from the steam turbine can have differing vapor fractions depending on the mode of operation of the steam turbine. Running with dry exhaust steam (i.e., having a higher dryness fraction) can produce less energy but can minimize wear and tear on the turbine. On the other hand, wetter exhaust steam can result in higher energy production, but also more wear and tear on the turbine.

As mentioned above, in some examples a second steam turbine generator can be added after the first steam turbine generator. The exhaust steam from the first steam turbine generator can be reheated using heat from the thermal energy storage. In further examples, a third, fourth, or more additional steam turbine generators can also be added. The thermal energy storage can be used to reheat the steam between each turbine, so long as the thermal energy storage has a sufficient amount of heat stored to reheat the steam multiple times in this way.

In another alternative, two turbines can be run in parallel. One turbine can operate a non-superheated cycle and a second turbine can operate a superheated cycle while the thermal energy storage system is discharging.

Regardless, after the steam has passed through the steam turbine generator to generate electricity, the steam can be cycled back to the low grade heat source. In some examples, the steam can be condensed and the condensate can be pumped back to the low grade heat source to begin the cycle again.

In some examples, the low grade heat source can provide a relatively constant supply of heat for evaporating steam. The process of evaporating steam, superheating the steam, and powering the steam turbine generator can be performed continuously, with exceptions for downtime for maintenance and so on. In contrast, the thermal energy storage can be recharged intermittently. In certain examples, the thermal energy storage can be heated to a high temperature during recharging, and then the temperature of the thermal energy storage can gradually decrease as heat is transferred from the thermal energy storage to the steam. The thermal energy storage can then be recharged again back to the high temperature. The process can be designed so that the temperature of the superheated steam is at or below the minimum temperature of the thermal energy storage. In some cases, if the intermittent electricity source does not provide enough electricity to recharge the thermal energy storage, then another source of electricity can be used. For example, the thermal energy storage can be recharged using a high grade heat. In certain examples, a portion of the electricity generated by the steam turbine generator can be used to recharge the thermal energy storage. In other examples, electricity from the power grid or from another on-demand source of electricity can be used.

Any discussion of features in the context of one example of the present technology can be applied to other examples of the present technology. Therefore, any features of systems described herein can also be applied to methods, and vice versa. For example, any equipment described with respect to systems can also be used in methods, and any operations described as being performed as part of the methods can also be performed with the systems described herein.

Examples—Statements of Invention

1. A method of generating electricity including: evaporating water with a low grade heat source to form low-temperature steam at a first temperature; superheating the low-temperature steam to a superheated temperature by transferring heat to the low-temperature steam from a thermal energy storage system that is at a temperature higher than the first temperature of the low-temperature steam; powering a steam turbine generator with the superheated steam to generate electricity; and recharging the thermal energy storage using electricity from an intermittent electricity source.

2. The method of any of clauses 1-12, wherein the low-temperature steam has an enthalpy within 10% of the enthalpy of pure saturated water vapor at the first temperature.

3. The method of any of clauses 1-12, wherein evaporating the water to form low-temperature steam, superheating the low-temperature steam, and powering the steam turbine are performed continuously while recharging the thermal energy storage is performed intermittently.

4. The method of any of clauses 1-12, wherein the low grade heat source is a geothermal well, industrial waste heat, a nuclear reactor, or a combination thereof.

5. The method of any of clauses 1-12, wherein the intermittent electricity source is a photovoltaic cell, solar thermal generator, hydroelectric generator, wind turbine, or combination thereof.

6. The method of any of clauses 1-12, further comprising recharging the thermal energy storage using electricity generated by the steam turbine generator.

7. The method of any of clauses 1-12, further comprising condensing exhausted steam from the steam turbine generator to form a condensate and returning the condensate to the low grade heat source.

8. The method of any of clauses 1-12, further comprising reheating exhausted steam from the steam turbine generator by transferring heat to the exhausted steam from the thermal energy storage and powering a second steam turbine generator with the reheated steam.

9. The method of any of clauses 1-12, further comprising switching the steam turbine generator between a first operation mode and a second operation mode to vary proportions of superheat, wherein the steam turbine generator exhausts steam having a lower vapor fraction in the first operation mode than in the second operation mode.

10. The method of any of clauses 1-12, wherein the thermal energy storage comprises a thermal storage medium selected from the group consisting of molten salt, silicon, cement, rock, and combinations thereof.

11. The method of any of clauses 1-12, wherein the low grade heat source has a temperature from about 100° C. to about 250° C. and wherein the first temperature is from about 100° C. to about 250° C.

12. The method of any of clauses 1-12, wherein the superheated temperature is from about 300° C. to about 1000° C.

13. An electricity generating system, including: a low grade heat source; a thermal energy storage having a temperature that is higher than a temperature of the low grade heat source; a superheater fluidly connected to the low grade heat source to receive low-temperature steam from the low grade heat source, wherein the superheater transfers heat from the thermal energy storage to the low-temperature steam to superheat the low-temperature steam to a superheated temperature; a steam turbine generator fluidly connected to the superheater to receive the superheated steam and generate electricity by converting power from the superheated steam; and an intermittent electricity source electrically connected to the thermal energy storage to recharge the thermal energy storage.

14. The system of any of clauses 13-22, wherein the low-temperature steam has an enthalpy within 10% of the enthalpy of pure saturated water vapor at the first temperature.

15. The system of any of clauses 13-22, wherein the low-temperature steam is formed continuously by evaporating water with heat from the low grade heat source, and wherein the low-temperature steam is superheated continuously, and wherein the steam turbine generator generates electricity continuously, and wherein the thermal energy storage is recharged intermittently.

16. The system of any of clauses 13-22, wherein the low grade heat source is a geothermal well, industrial waste heat, a nuclear reactor, or a combination thereof.

17. The system of any of clauses 13-22, wherein the intermittent electricity source is a photovoltaic cell, solar thermal generator, hydroelectric generator, wind turbine, or combination thereof.

18. The system of any of clauses 13-22, wherein the steam turbine generator is also electrically connected to the thermal energy storage to recharge the thermal energy storage using electricity generated by the steam turbine generator.

19. The system of any of clauses 13-22, further comprising a condenser fluidly connected to the steam turbine generator to receive exhausted steam from the steam turbine generator and condense the exhausted steam to form a condensate, wherein the condenser is also fluidly connected to the low grade heat source to return the condensate to the low grade heat source.

20. The system of any of clauses 13-22, further comprising: a reheater fluidly connected to the steam turbine generator to receive exhausted steam from the steam turbine generator, wherein the reheater transfers heat from the thermal energy storage to the exhausted steam; and a second steam turbine generator fluidly connected to the reheater to receive reheated steam from the reheater and generate electricity by converting power from the reheated steam.

21. The system of any of clauses 13-22, wherein the steam generator is switchable between a first operation mode and a second operation mode, wherein the steam turbine generator exhausts steam having a lower vapor fraction in the first operation mode than in the second operation mode.

22. The system of any of clauses 13-22, wherein the thermal energy storage comprises a thermal storage medium selected from the group consisting of molten salt, silicon, cement, rock, and combinations thereof.

What is claimed is:
1. A method of generating electricity, comprising:
evaporating water with a low grade heat source to form low-temperature steam at a first temperature;

superheating the low-temperature steam to a superheated temperature by transferring heat to the low-temperature steam from a thermal energy storage that is at a temperature higher than the first temperature of the low-temperature steam;

powering a steam turbine generator with the superheated steam to generate electricity; and recharging the thermal energy storage using electricity from an intermittent electricity source.

2. The method of claim 1, wherein the low-temperature steam has an enthalpy within 10% of the enthalpy of pure saturated water vapor at the first temperature.

3. The method of claim 1, wherein evaporating the water to form low-temperature steam, superheating the low-temperature steam, and powering the steam turbine are performed continuously while recharging the thermal energy storage is performed intermittently.

4. The method of claim 1, wherein the low grade heat source is a geothermal well, industrial waste heat, a nuclear reactor; or a combination thereof.

5. The method of claim 1, wherein the intermittent electricity source is a photovoltaic cell, solar thermal generator, hydroelectric generator, wind turbine, or combination thereof.

6. The method of claim 1; further comprising recharging the thermal energy storage using electricity generated by the steam turbine generator.

7. The method of claim 1, further comprising condensing exhausted steam from the steam turbine generator to form a condensate and returning the condensate to the low grade heat source.

8. The method of claim 1, further comprising reheating exhausted steam from the steam turbine generator by transferring heat to the exhausted steam from the thermal energy storage and powering a second steam turbine generator with the reheated steam.

9. The method of claim 1, further comprising switching the steam turbine generator between a first operation mode and a second operation mode to vary proportions of superheat, wherein the steam turbine generator exhausts steam having a lower vapor fraction in the first operation mode than in the second operation mode.

10. The method of claim 1, wherein the thermal energy storage comprises a thermal storage medium selected from the group consisting of molten salt, silicon, cement, rock, and combinations thereof.

11. The method of claim 1, wherein the low grade heat source has a temperature from about 100° C. to about 250° C. and wherein the first temperature is from about 100° C. to about 250° C.

12. The method of claim 1, wherein the superheated temperature is from about 300° C. to about 1000° C.

13. An electricity generating system, comprising:
a low grade heat source;
a thermal energy storage having a temperature that is higher than a temperature of the low grade heat source;
a superheater fluidly connected to the low grade heat source to receive low-temperature steam from the low grade heat source, wherein the superheater transfers heat from the thermal energy storage to the low-temperature steam to superheat the low-temperature steam to a superheated temperature;
a steam turbine generator fluidly connected to the superheater to receive the superheated steam and generate electricity by converting power from the superheated steam; and
an intermittent electricity source electrically connected to the thermal energy storage to recharge the thermal energy storage.

14. The system of claim 13, wherein the low-temperature steam has an enthalpy within 10% of the enthalpy of pure saturated water vapor at the first temperature.

15. The system of claim 13, wherein the low-temperature steam is formed continuously by evaporating water with heat from the low grade heat source, and wherein the low-temperature steam is superheated continuously, and wherein the steam turbine generator generates electricity continuously, and wherein the thermal energy storage is recharged intermittently.

16. The system of claim 13, wherein the low grade heat source is a geothermal well, industrial waste heat, a nuclear reactor, or a combination thereof.

17. The system of claim 13, wherein the intermittent electricity source is a photovoltaic cell, solar thermal generator, hydroelectric generator, wind turbine, or combination thereof.

18. The system of claim 13, wherein the steam turbine generator is also electrically connected to the thermal energy storage to recharge the thermal energy storage using electricity generated by the steam turbine generator.

19. The system of claim 13, further comprising a condenser fluidly connected to the steam turbine generator to receive exhausted steam from the steam turbine generator and condense the exhausted steam to form a condensate, wherein the condenser is also fluidly connected to the low grade heat source to return the condensate to the low grade heat source.

20. The system of claim 13, further comprising:
a reheater fluidly connected to the steam turbine generator to receive exhausted steam from the steam turbine generator, wherein the reheater transfers heat from the thermal energy storage to the exhausted steam; and
a second steam turbine generator fluidly connected to the reheater to receive reheated steam from the reheater and generate electricity by converting power from the reheated steam.

21. The system of claim 13, wherein the steam generator is switchable between a first operation mode and a second operation mode, wherein the steam turbine generator exhausts steam having a lower vapor fraction in the first operation mode than in the second operation mode.

22. The system of claim 13, wherein the thermal energy storage comprises a thermal storage medium selected from the group consisting of molten salt, silicon, cement, rock, and combinations thereof.

* * * * *